United States Patent [19]
Fagel

[11] 3,931,869
[45] Jan. 13, 1976

[54] BRAKING DEVICE FOR RAILROAD BOGIE RUNNING AT HIGH SPEED

[75] Inventor: Roger Fagel, Marcinelle, Belgium

[73] Assignee: Ateliers de Constructions Electriques de Charleroi (ACEC), Belgium

[22] Filed: June 7, 1974

[21] Appl. No.: 477,288

[30] Foreign Application Priority Data
June 12, 1973  Belgium ................................... 5147
Nov. 29, 1973 Belgium ................................... 5545

[52] U.S. Cl. ..................... 188/41; 105/77; 188/156; 188/165
[51] Int. Cl.² ..................... B61H 7/00; F16D 65/34
[58] Field of Search .......... 188/41, 156, 265; 303/3; 318/370, 371; 105/77, 78

[56] References Cited
UNITED STATES PATENTS

| | | | |
|---|---|---|---|
| 1,604,564 | 10/1926 | Cecero ................................. | 188/41 |
| 2,106,489 | 1/1938 | McCune ............................ | 188/165 |
| 2,789,665 | 4/1957 | Wright ............................. | 188/4 R |
| 3,162,276 | 12/1964 | Bohn ........................... | 188/196 R X |
| 3,723,795 | 3/1973 | Baermann ............................ | 188/41 |

FOREIGN PATENTS OR APPLICATIONS

| | | | |
|---|---|---|---|
| 846,525 | 6/1939 | France ............................. | 188/165 |
| 4,021 | 2/1909 | United Kingdom ................... | 188/41 |
| 496,102 | 7/1954 | Italy ..................................... | 188/41 |

*Primary Examiner*—George E. A. Halvosa
*Attorney, Agent, or Firm*—Raymond A. Robic; Peter G. Mack; Arthur Schwartz

[57] ABSTRACT

Braking device for railroad bogie running at high speed, comprising a fixed part integrally connected to the frame of the bogie and a movable part suspended from the fixed part and adapted to be vertically displaced by suitable means towards a rail. The movable part is provided at its lower face with a series of electromagnets arranged above the rail. The series of electromagnets is flanked at each of its sides with a braking shoe adapted to be applied on the rail at the moment of braking in such a way that the electromagnets be placed at a relatively small distance from the rail. Means are provided for controlling the position of the braking shows as a function of the wearing of the shoe.

2 Claims, 2 Drawing Figures

BRAKING DEVICE FOR RAILROAD BOGIE RUNNING AT HIGH SPEED

The present invention relates to an electrical and mechanical braking device on a rail or tracks of a railroad bogie running at very high speed. Compared to the known systems, the bogie of the present invention presents particularly important advantages with respect to the weight of the braking electromagnets and the regularity of the operation.

In the known electrical braking devices on rail, it is indeed necessary to provide a substantially important space or clearance between the braking electromagnets and the rail in order to take into account on the one hand the suspension flexibility and on the other hand the wearing of the treading or padding of the tires. Therefore, it results a heavy and bulky construction of the electromagnets and a very high consumption of power.

According to the present invention, a relatively small clearance or air gap is provided only at the braking time, this clearance being determined by the provision of braking shoes on the rail, the clearance being maintained to an approximately constant value whatever will be the wearing degree of the braking shoes.

According to the invention, the braking device for railboard bogie running at a high speed is characterized in that it comprises a fixed part integrally connected to the frame of the bogie and a movable part suspended to the fixed part and being adapted to be vertically displaced towards the rail by suitable means, the movable part being provided on its lower face with a series of electromagnets arranged above the rail and flanked, at each of its sides, by a braking shoe adapted to contact the rail at the moment of braking, in such a way that the electromagnets be located at a relatively small distance from the rail, the device comprising detection means for compensating the wearing of the braking shoe to maintain the distance between the electromagnets and the rail at a constant value.

It should be noted that in general, at very high speeds, the Foucault or Eddy currents induced in the rail by the electromagnets are important whereas the magnetic attraction is small. On the contrary, at low speeds, it is the magnetic attraction which predominates and consequently the mechanical braking by the shoe. It results that it is possible to obtain an approximately constant braking at all speeds.

Other objects and characteristics of the invention will appear during the description of the drawings given in a non-limitative way. In these drawings.

Figure 1:
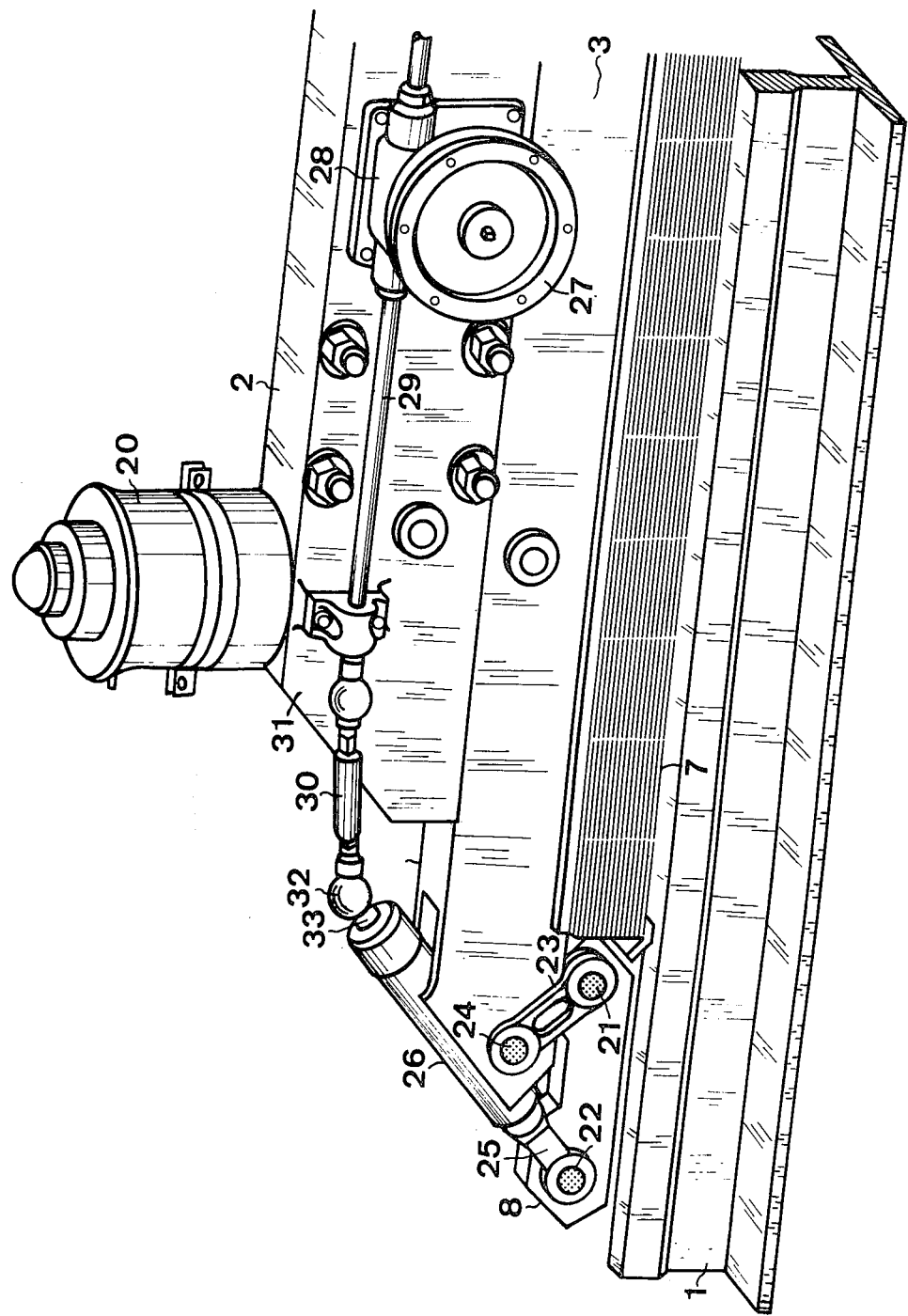
FIG. 1 shows an embodiment of the braking device according to the invention.

Referring now to the drawings and more particularly to FIG. 1, which is a partial perspective view, there is shown a rail 1 on which runs a bogie comprising a braking device of the bogie consisting of a fixed part 2 integrally connected to the frame of the bogie and of a movable part 3 which may be displaced towards rail 1, for instance under the action of pneumatic cylinders 20 carried by the fixed part 2. Movable part 3 is equipped, at its lower face, with a series of electromagnets 7 the windings of which are provided with wings or flanges for their cooling.

The series of electromagnets 7 is flanked at each of its sides by a braking shoe 8 which is symmetrical and chamfered at its both sides. The shoe is adapted to be applied, at the time of the braking, against rail 1, in such a way that the electromagnets 7 present with respect to rail 1 a relatively small clearance. Shoe 8 is articulated at its extremities, by means of axles 21 and 22, respectively, on the one hand, to the extremety of a pair of crank-arms such as 23, the other extremety of which pair may pivot around an axle 24 integrally connected to the movable part 3, and on the other hand to the extremity of a fork 25 controlling the position of the shoe as a function of the wearing of the shoe.

Fork 25 is integral with a rod longitudinally slideable in a cylindrical body 26, integrally connected to the movable part 3 and containing a screw mechanism which will be described later. The screw mechanism may, for instance, be controlled by a motor electrical brake 27 equipped with an outlet worm screw 28, which, via shaft 29, coupling sleeve 30 and universal joints 31 and 32, provides the rotation of a rod 33 extending inside the cylindrical body 26.

The axles 21 and 22 are in a plane parallel to the rail and the pair of small crank-arms such as 23 are inclined with respect to the cylindrical body 26 in such a way that, when the fork 25 is displaced, the shoe 8 is lowered towards rail 1 approximately parallel to itself.

Figure 2:
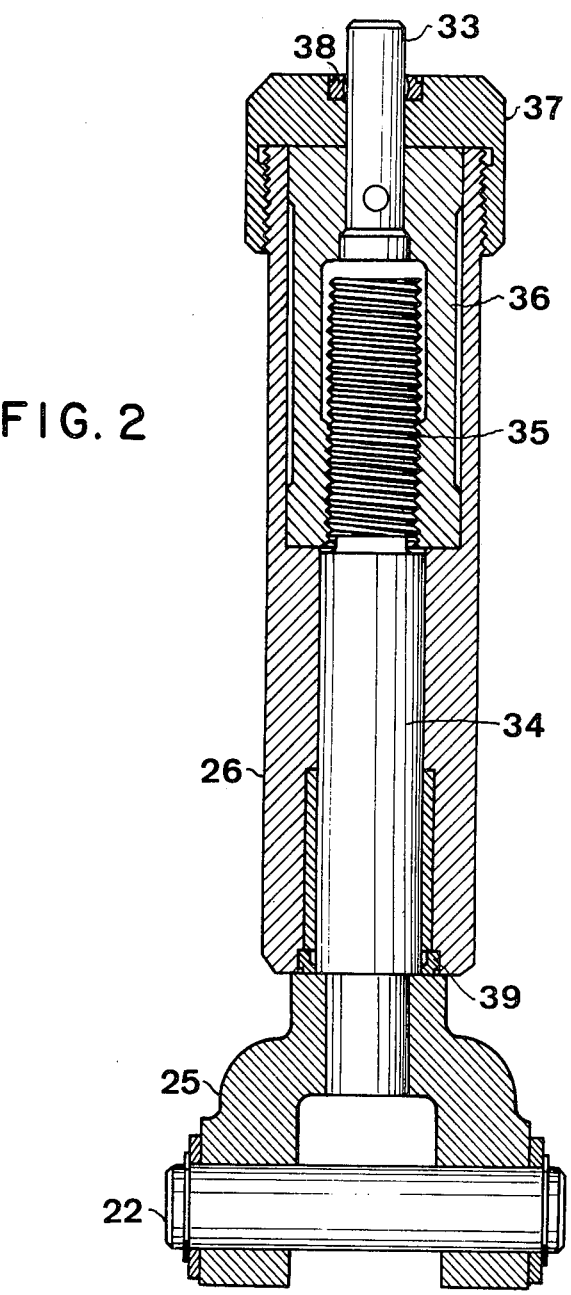
FIG. 2 shows a detail of the means utilized for compensating the wearing of the braking shoes.

By referring to FIG. 2, it is seen that the cylindrical body 26 co-operates on the one hand with the fork 25 and rod 33, controlled as above described by means of motor brake 27. Fork 25 is integrally provided with a rod 34 which terminates inside the cylindrical body 26 by a threaded part 35. On the other hand, the rod 33 is integrally connected with a nut 36 which co-operates with the threaded part 35 of the rod 34. A lid 37 is screwed on the upper end of the cylindrical body 26 and tightening or insulating members 38 and 39 are provided around rod 33 and rod 34 respectively.

As it is seen in FIG. 2, the rotation of rod 33, and consequently of nut 36, provides the displacement of the threaded part 35 of rod 34 and therefore of the fork 25 which produces a displacement of the articulation axle 22 and a subsequent lowering of the shoe 8.

In this way, whatever may be the wearing of the shoes, when they are applied on rail 1, the distance between the electromagnets 7 and the rail 1, and consequently the air-gap clearance of the electrical part of the braking device remains constant.

The detection of the wearing of the braking shoe may be realized by a suitable means. For instance, a pneumatic system may be provided which comprises a fixed nozzle supplied with compressed air and which is disposed against the lateral face of the braking shoe, at the vicinity of the lower edge of the shoe. If the braking shoe has undergone a wearing too important for the normal operation of the device, the lower face of the shoe, during its return to its non braking position, uncovers the fixed nozzle means in a larger measure and the compressed air output variation may be detected and used for triggering the operation of the means for controlling the position of the braking shoe as a function of the wearing of the shoe.

Other detection devices than the pneumatic system above described may be used such, for instance, devices based on the variation of the magnetic reluctance or a variation of the value of the Hall effect in a circuit one element of which is constituted by the braking shoe. Purely mechanical devices may also be used.

The braking shoe may also serve as a parking brake when the movable part is lowered towards the rail whereas the electromagnets integrally connected to the movable part are not energized.

It should be noted that technological variations in the means employed in the different embodiments above described may be introduced without departing from the scope of the present invention.

I claim:

1. A braking device for a railroad bogie which supports a vehicle above a rail comprising:
   a. a fixed part integrally connected with the bogie;
   b. a movable part suspended from said fixed part, said movable part having a lower side;
   c. a series of electromagnets suspended from said lower side of said movable part and being movable with said movable part;
   d. a pair of friction brake shoes, one of said pair of friction brake shoes being disposed adjacent to one end of said series of electromagnets the other of said pair of friction brake shoes being disposed adjacent to the other end of said series of electromagnets, said friction brake shoes also being suspended from said lower side of said movable part and being movable therewith, said friction brake shoes extending a greater distance from said lower side and extending closer to the rail than said electromagnets;
   e. means for moving said movable part from a position adjacent to said fixed part and spaced from the rail to a position spaced from said fixed part and adjacent said rail such that said friction brake shoes contact said rail but such that a small air gap exists between the electromagnets and the rail;
   f. plural means on said movable part displaceably mounting said friction brake shoes for displacement relative to said movable part, each of said plural mounting means mounting one of said friction brake shoes;
   g. motive means on said fixed part;
   h. means for transmitting motive force from said motive means to said mounting means said transmitting means extending between said motive means and said mounting means;
   i. whereby said motive means is actuated upon wear of the friction brake shoes to move said friction brake shoes in a direction toward the rail to maintain said small air gap regardless of wear on the friction brake shoes.

2. The invention of claim 1 wherein said transmitting means includes an extensible screw mechanism, a rotatable shaft coupled therewith, and a straight rod which is movable telescopically with respect to said screw mechanism in response to rotation of said shaft and wherein each of said mounting means includes:
   a. a first axle on its associated friction brake shoe said first axle being disposed adjacent that end of said associated shoe nearest said series of electromagnets;
   b. a second axle on said movable part;
   c. a pair of parallel crank arms extending between said first and second axles, said associated friction brake shoe being disposed between said crank arms;
   d. a third axle on said associated friction brake shoe and adjacent the other end thereof;
   e. said straight rod having a yoke on one end, said yoke being directly coupled to said third axle;
   f. said first and third axles being disposed in a plane parallel to a lower face of said associated friction brake shoe and parallel to the rail;
   g. wherein said straight rod and said crank arms are inclined with respect to said lower face of said associated friction brake shoe;
   h. whereby said lower face of said associated friction brake shoe remains approximately parallel to the rail when the friction brake shoe is moved towards the rail to compensate for wear.

* * * * *